United States Patent Office 3,489,804
Patented Jan. 13, 1970

3,489,804
SULFUR CONTAINING BIS-PHENOLIC COMPOUNDS
Francis X. O'Shea, Naugatuck, Conn., assignor to Uniroyal, Inc., a corporation of New Jersey
No Drawing. Filed Feb. 23, 1967, Ser. No. 617,856
Int. Cl. C07c 149/36
U.S. Cl. 260—609                 9 Claims

ABSTRACT OF THE DISCLOSURE

This invention relates to a series of bisphenolic compounds represented by the following formula:

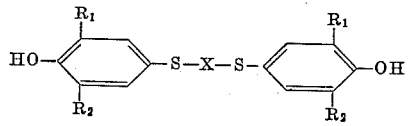

wherein $R_1$ may be an alkyl group of one to eight carbon atoms or a cycloalkyl group of six to eight carbon atoms, where $R_2$ may be an alkyl group of three to eight carbon atoms which is branched on the α-carbon, or a cycloalkyl group of six to eight carbon atoms, and where X is a diradical containing from two to about thirty carbon atoms. These compounds have utility as antioxidants and stabilizers for various hydrocarbon polymers.

---

The compounds of this invention are represented by the formula:

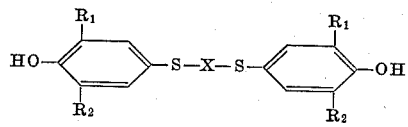

wherein $R_1$ may be an alkyl group of one to eight carbon atoms or a cycloalkyl group of six to eight carbon atoms, where $R_2$ may be an alkyl group of three to eight carbon atoms which is branched on the α-carbon, or a cycloalkyl group of six to eight carbon atoms, and where X is a diradical containing from two to about thirty carbon atoms and is selected from the group consisting of:

(a) Polymethylene diradicals of the formula $$-(CH_2)_n-$$

wherein $n$ is a whole number from 2 to 30, for example: $-CH_2CH_2-$ and $-(CH_2)_{30}-$.

(b) Branched chain polyalkylene diradicals of the formula:

wherein $n$ is a whole number from 0 to 26 and the R groups may be hydrogen or alkyl groups and at least one of the R groups is an alkyl group, for example:

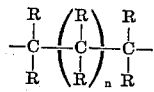

(c) Aralkyl diradicals of the formula

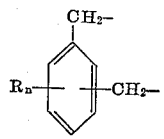

wherein R is an alkyl group of 1 to 4 carbon atoms and $n$ is a whole number from 0 to 4, for example:

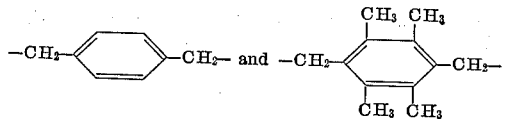

(d) Aralkyl diradicals of the formulae:

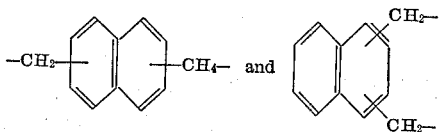

(e) Aralkyl diradicals of the formulae:

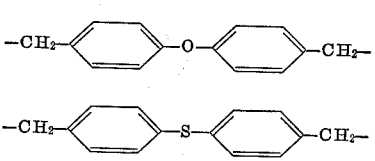

(f) Cyclic hydrocarbon containing diradicals of the general formula:

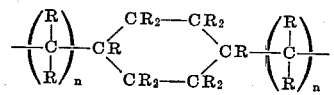

wherein R may be hydrogen or an alkyl group and $n$ is a whole number from 0 to 6, for example

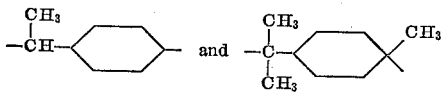

(g) Aliphatic diradicals containing hetero atoms of the general formula:

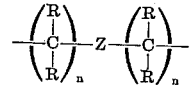

wherein R may be hydrogen or alkyl, $n$ is a whole number from 1 to 6 and Z is selected from the group consisting of $-O-$, $-S-$, $-SO_2$ and $-NR'-$ (wherein R' is an alkyl group), for example, $-CH_2CH_2OCH_2CH_2-$ and $-CH_2CH_2SCH_2CH_2-$.

(h) Diradicals of the formulae:

$$-CH_2CH_2OCH_2CH_2OCH_2CH_2-$$

and $$-CH_2CH_2OCH_2OCH_2CH_2-$$

(i) Aralkyl diradicals of the general formula:

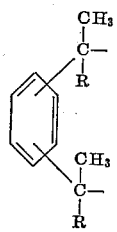

wherein R may be hydrogen or an alkyl group, for example:

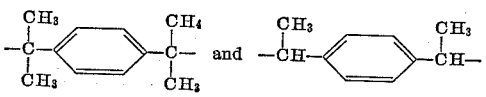

(j) Diradicals of the formula:

wherein R is an alkyl group of 1 to 5 carbon atoms.

(k) The diradical of the formula:

The compounds of my invention may be prepared by one of two general methods.

*Method A.*—This method involves the reaction of two molar equivalents of a mercaptophenol of the general formula:

in which $R_1$ and $R_2$ are as previously described with two molar equivalents of an alkali metal hydroxide, e.g. sodium hydroxide and potassium hydroxide, and one molar equivalent of an organic dihalide of the formula:

Hal—X—Hal in which Hal represents a halogen atom and X is as previously described. The following equation illustrates a preparation of this type:

$$(CH_3)_3C\text{-}C_6H_2(OH)(CH_3)(SH) + ClCH_2CH_2Cl + 2NaOH \longrightarrow$$

$$HO\text{-}C_6H_2((CH_3)_3C)(CH_3)\text{-}SCH_2CH_2S\text{-}C_6H_2(C(CH_3)_3)(CH_3)\text{-}OH + 2NaCl + 2H_2O$$

The reaction may be carried out in a suitable water miscible solvent such as methanol, ethanol, isopropanol, dioxane, ethylene glycol dimethyl ether, etc. at a temperature from about room temperature to about 100° C. Preferred solvents for the reaction are methanol, ethanol and isopropanol. The preferred temperature is in the range of 50° C. to 100° C., the reaction ordinarily being carried out at or near the reflux temperature of the solution. The preferred time of the reaction is up to four hours. Longer times may be used but are not necessary, the reaction generally being complete in 30 minutes or less.

The reaction may also be carried out in a two-phase system such as benzene-water or xylene-water, using vigorous agitation. Although longer reaction times are generally employed than in homogenous solution, this heterogeneous system has the advantage of providing a simplified recovery procedure. In such a two-phase system the product is soluble in the organic phase which can be readily separated from the aqueous phase containing the alkali metal halide. The product is finally obtained by removing the solvent from the organic phase.

*Method B.*—This method involves the reaction of two molar equivalents of a mercaptophenol of the general formula:

in which $R_1$ and $R_2$ are as previously described, with one molar equivalent of a non-conjugated diolefin of from 5 to 30 carbon atoms under acid catalysis. The following equation illustrates a preparation of this type:

This reaction may be carried out without a solvent or in a non-polar organic solvent such as hexane, benzene, xylene, etc. at a temperature up to about 150° C. The acid catalyst which may be employed includes, but is not limited to, mineral acids, such as sulfuric acid, hydrochloric acid, $AlCl_3$ and $BF_3$, and heterogeneous catalysts such as acid clays and acidic ion exchange resins.

Some of the diolefins which may be used include:

Para-diisopropenyl benzene,
Meta-diisopropenyl benzene,
Divinyl benzene,
Vinyl isopropenyl benzene,
1,7-octadiene,
Vinyl cyclohexene,
1-methyl-4-isopropenyl cyclohexene-1,
1,4-hexadiene,
1,13-tetradecadiene
2,7-dimethyl-1,7-octadiene,
Ethylidene norbornene and
Isopropylidene norbornene.

Some of the mercaptophenols which may be used include:

2,6-diisopropyl-4-mercaptophenol,
2-methyl-4-mercapto-6-t-butylphenol,
2,6-di-sec-butyl-4-mercaptophenol,
2,6-di-t-butyl-4-mercaptophenol,
2-methyl-4-mercapto-6-cyclohexylphenol,
2,6-dicyclohexyl-4-mercaptophenol,
2-methyl-4-mercapto-6-cyclooctylphenol,
2,6-dicyclooctyl-4-mercaptophenol,
2-methyl-4-mercapto-6-(a-methylheptyl)phenol,
2,6-di(a-methylheptyl)-4-mercaptophenol and
2,6-di-t-octyl-4-mercaptophenol.

The novel compounds disclosed herein have previously been unreported, and such compounds are set forth for the first time. In U.S. Paent No. 2,472,318 issued June 7, 1949 to Philip Subkow, compounds of the following formula were disclosed:

RSR′SR wherein R is selected from the group consisting of an aryl, alkylaryl, substituted aryl, alkylaryl groups, S is sulfur and R′ is a low molecular weight alkyl group. These compounds are disclosed as possessing activity as oxidation inhibitors for lubricating oils. Among the possible structures set forth by Subkow was included the following compound, which is considered the closest prior art uncovered:

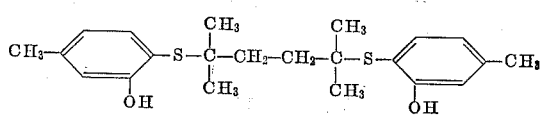

My contribution differs from the prior art in that the compounds of the instant invention contain two alkyl groups on each benzene ring, both being in the ortho position with relation to the phenolic hydroxyl groups. In addition, at least one alkyl group on each ring is branched on the alpha carbon atom. The prior art does not describe any alkyl group longer than methyl, does not describe any compound with two alkyl groups on each benzene ring and does not exhibit an alkyl group in the ortho position with relation to the phenolic hydroxyl groups.

Furthermore, the prior art compounds of Subkow are never credited with antioxidant activity in the preparation of polymers; while the compounds of my invention display excellent antioxidant activity for various polymer systems, e.g. rubber and plastics.

To illustrate the novel bis-phenol compounds and their methods of preparation, the following examples are given. In the examples, the proportions are expressed in parts by weight unless otherwise noted.

Example 1

The preparation of 1,4 - bis(3-methyl-4-hydroxy-5-t-butylphenylthio)-butane.

To a solution of 9.8 g. (0.05 mole) of 2-methyl-4-mercapto-6-t-butylphenol and 4 g. (0.05 mole) of 50% aqueous sodium hydroxide in 75 ml. of ethanol was added 3.2 g. (0.025 mole) of 1,4-dichlorobutane. The reaction mixture was refluxed gently for 15 minutes. The solution was then poured into cold water and the product was extracted with ether. The ether extract was washed with water, dried over anhydrous sodium sulfate and evaporated down to a solid residue which was recrystallized from hexane yielding 9 g. (80% yield) of 1,4-bis(3-methyl - 4 - hydroxy - 5 - t - butylphenolthio)butane, M.P. 80–82°.

Analysis.—Calc'd for $C_{26}H_{38}O_2S_2$: percent C, 69.90; percent H, 8.52; percent S, 14.30.

Found: percent C, 69.65; percent H, 8.54; percent S, 14.54.

Example 2

The preparation of 1,2 - bis(3 - methyl - 4 - hydroxy - 5 - t - butylphenylthio) - ethane.

2 - methyl - 4 - mercapto - 6 - t - butylphenol was reacted with ethylene dichloride in the manner described in Example 1 to give a 77% yield of 1,2 - bis(3 - methyl - 4 - hydroxy - 5 - t - butylphenylthio)ethane, M.P. 142–144° C.

Analysis.—Calc'd for $C_{24}H_{34}O_2S_2$: percent C, 68.90; percent H, 8.14; percent S, 15.30.

Found: percent C, 68.84; percent H, 8.11; percent S, 15.68.

Example 3

The preparation of 1,2 - bis(3,5 - di - t - butyl - 4 - hydroxyphenylthio)ethane.

2,6 - di - t - butyl - 4 - mercaptophenol was reacted with ethylene dichloride in the manner described in Example 1 to yield 1,2 - bis(3,5 - di - t - butyl - 4 - hydroxyphenylthio)ethane, M.P. 158–159° after recrystallization from methanol.

Analysis.—Calc'd for $C_{30}H_{46}O_2S_2$: percent C, 71.71; percent H, 9.16; percent S, 12.74.

Found: percent C, 71.89; percent H, 9.20; percent S, 12.74.

Example 4

The preparation of 1,4 - bis(3,5 - di - t - butyl - 4 - hydroxyphenylthio)butane.

2,6 - di - t - butyl - 4 - mercaptophenol was reacted with 1,4 - dichlorobutane in the manner described in Example 1 to yield 1,4 - bis(3,5-di-t-butyl-4-hydroxyphenylthio)butane, M.P. 137–140°.

Analysis.—Calc'd for $C_{32}H_{50}O_2S_2$: percent C, 72.45; percent H, 9.43; percent S, 12.30.

Found: percent C, 72.28; percent H, 9.51; percent S, 12.37.

Example 5

The preparation of 1,2 - bis(3,5 - diisopropyl - 4 - hydroxyphenylthio)ethane.

2,6 - diisopropyl - 4 - mercaptophenol was reacted with ethylene dichloride in the manner described in Example 1 to yield 1,2 - bis(3,5 - diisopropyl - 4 - hydroxyphenylthio)ethane, M.P. 116–117° after recrystallization from hexane.

Analysis.—Calc'd for $C_{26}H_{38}O_2S_2$: percent C, 69.95; percent H, 8.52; percent S, 14.35.

Found: percent C, 69.67; percent H, 8.51; percent S, 14.48.

Example 6

The preparation of α,α' - bis(3 - methyl - 4 - hydroxy - 5 - t - butylphenylthio) - p - xylene.

2 - methyl - 4 - mercapto - 6 - t - butylphenol was reacted with α,α' - dichloro - p - xylene in the manner described in Example 1 to yield α,α' - bis(3 - methyl - 4 - hydroxy - 5 - t - butylphenylthio) - p - xylene, M.P. 110–112°.

Analysis.—Calc'd for $C_{30}H_{38}O_2S_2$: percent C, 73.0; percent H, 7.70; percent S, 13.0.

Found: percent C, 73.22; percent H, 7.75; percent S, 13.20.

Example 7

The preparation of β,β' - bis(3 - methyl - 4 - hydroxy - 5 - t - butylphenylthio)diethyl ether.

2 - methyl - 4 - mercapto - 6 - t - butylphenol was reacted with β,β' - dichlorodiethyl ether in the manner described in Example 1 to give β,β' - bis(3 - methyl - 4 - hydroxy - 5 - t - butylphenylthio)diethyl ether as a viscous oil.

Example 8

The preparation of α,α' - bis[3 - methyl - 4 - hydroxy - 5 - t - butylphenylthio] - p - diisopropylbenzene.

To a solution of 19.6 g. (0.1 mole) of 2 - methyl - 4 - mercapto - 6 - t - butylphenol and 7.9 g. (0.05 mole) of p - diisopropenyl benzene in 20 ml. of benzene was added 4 g. of KSFO activated montmorillonite catalyst. The mixture was heated on the steam bath overnight. It was then filtered and evaporated down to yield α,α' - bis(3 - methyl - 4 - hydroxy - 5 - t - butylphenylthio) - p - diisopropyl benzene as a viscous oil.

Example 9

The preparation of 1-methyl-1-(3-methyl-4-hydroxy-5-t - butylphenylthio) - [α - (3 - methyl-4-hydroxy-5-t-butyl phenylthio)isopropyl]cyclohexane.

In the same manner as described in Example 8, 9.8 g. (0.05 mole) of 2-methyl-4-mercapto-6-t-butylphenol was reacted with 3.4 g. (0.025 mole) of d-limonene using 1 g. of KSFO catalyst. The product was obtained as a viscous oil.

Example 10

The preparation of 2,7-bis(3-methyl-4-hydroxy-5-t-butylphenylthio)octane.

In the same manner as described in Example 8, 9.8 g. (0.05 mole) of 2-methyl-4-mercapto-6-t-butylphenol was reacted with 2.8 g. (0.025 mole) of 1,7-octadiene using 0.5 g. of KSFO catalyst. The product was obtained as a viscous oil.

Example 11

The preparation of 4,8-bis(3,5-di-sec-butyl-4-hydroxyphenylthio)-tricyclo[$5 \cdot 2 \cdot 1 \cdot 0^{2,6}$]decane.

In the same manner as described in Example 8, 11.8 g. (0.05 mole) of 2,6-di-sec-butyl-4-mercaptophenol was reacted with 3.3 g. (0.025 mole) of dicyclopentadiene using 1 g. of KSFO catalyst. The product was obtained as a viscous oil.

Example 12

The preparation of 1-[α-(3,5-dicyclooctyl-4-hydroxyphenylthio)ethyl] - 4 - (3,5 - dicyclooctyl-4-hydroxyphenylthio)-bicyclo[$2 \cdot 2 \cdot 1$]heptane.

In the same manner as described in Example 8, 17.3 g. (0.05 mole) of 2,6-dicyclooctyl-4-mercaptophenol was reacted with 3.0 g. (0.025 mole) of ethylidene norbornene using 1 g. of KSFO catalyst. The product was obtained as a viscous oil.

I claim:
1. A chemical of the formula:

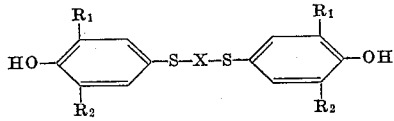

wherein $R_1$ is selected from the group consisting of an alkyl group of 1–8 carbon atoms and a cycloalkyl group of 6–8 carbon atoms and wherein $R_2$ is selected from the group consisting of an alkyl group of 3–8 carbon atoms branched on the α carbon atom and a cycloalkyl group of 6–8 carbon atoms and wherein X is a diradical containing from 2–30 carbon atoms and is selected from the group consisting of:

(a) polymethylene diradicals of the formula $$-(CH_2)_n-$$

wherein $n$ is a whole number from 2 to 8;

(b) branched chain polyalkylene diradicals of the formula:

wherein $n$ is a whole number from 0 to 10 and the R groups may be hydrogen or alkyl groups and at least one of the R groups is an alkyl group;

(c) aralkyl diradicals of the formula:

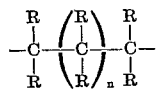

wherein R is an alkyl group of 1 to 4 carbon atoms and $n$ is a whole number from 0 to 4;

(d) aralkyl diradicals of the formulae:

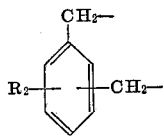

(e) aralkyl diradicals of the formulae:

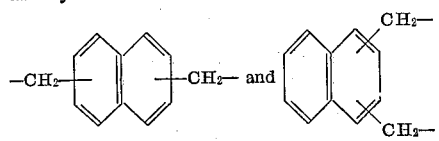

(f) cyclic hydrocarbon containing diradicals of the general formula:

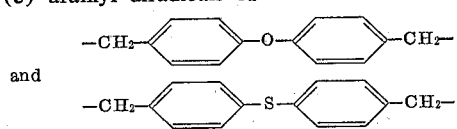

wherein R may be hydrogen or an alkyl group of up to 6 carbon atoms, and $n$ is a whole number from 0 to 6;

(g) aliphatic diradicals containing hetero atoms of the general formula

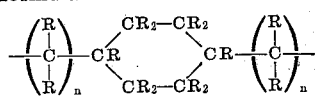

wherein R may be hydrogen or alkyl group of up to 6 carbon atoms, $n$ is a whole number from 1 to 6 and Z may be —O—, —S—, —$SO_2$—;

(h) diradicals of the formulae:

$$-CH_2-CH_2-OCH_2-CH_2-OCH_2-CH_2-$$

and $$-CH_2-CH_2-OCH_2-OCH_2-CH_2-$$

(i) aralkyl diradicals of the general formula:

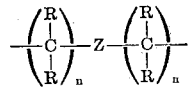

wherein R is selected from the group consisting of hydrogen and an alkyl group of from 1–12 carbon atoms.

(j) diradicals of the formula:

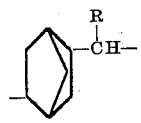

wherein R is an alkyl group of 1 to 5 carbon atoms, (k) the diradical of the formula:

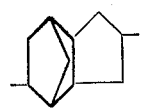

2. A chemical of claim 1, wherein $R_1$ is an alkyl group of from 1 to 8 carbon atoms, $R_2$ is an alkyl group of from 3 to 8 carbon atoms and X is ethane.

3. 1,4 - bis(3 - methyl - 4-hydroxy-5-t-butylphenylthio) butane.

4. 1,2 - bis(3 - methyl - 4-hydroxy-5-t-butylphenylthio) ethane.

5. 1,2 - bis(3,5 - di - t - butyl - 4 - hydroxyphenylthio) ethane.

6. 1,2 - bis(3,5 - diisopropyl - 4 - hydroxyphenylthio) ethane.

7. α,α' - bis(3 - methyl - 4 - hydroxy - 5 - t-butylphenylthio)-p-xylene.

8. β,β' - bis(3 - methyl - 4 - hydroxy - 5 - t - butylphenylthio)-diethyl ether.

9. α,α' - bis(3 - methyl - 4 - hydroxy - 5 - t - butylphenylthio)-p-diisopropylbenzene.

References Cited

Ipatieff et al.: J. Amer. Chem. Soc., vol. 60 (1938), pp. 2731–34.

Galt et al.: J. Chem. Soc. (1959).

Vander Ploeg et al.: Rec. Trav. Chem., vol. 81 (1962), pp. 775–785.

CHARLES B. PARKER, Primary Examiner

D. R. PHILLIPS, Assistant Examiner

U.S. Cl. X.R.

252—402, 404; 260—45.9, 45.95, 570.5

PO-1050
(5/69)

UNITED STATES PATENT OFFICE
CERTIFICATE OF CORRECTION

Patent No. 3,489,804                    Dated January 13, 1970

Inventor(s) Francis X. O'Shea

It is certified that error appears in the above-identified patent and that said Letters Patent are hereby corrected as shown below:

The formula in Claim 1 part (C) should read:

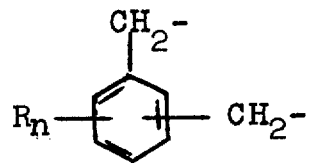

SIGNED AND
SEALED
JUL 14 1970

(SEAL)
Attest:

Edward M. Fletcher, Jr.
Attesting Officer

WILLIAM E. SCHUYLER, JR.
Commissioner of Patents